Oct. 30, 1951  R. P. HOMILLER ET AL  2,572,846
PROCESS FOR THE PREPARATION OF FULL FLAVORED FRUIT CONCENTRATES
Filed June 20, 1950
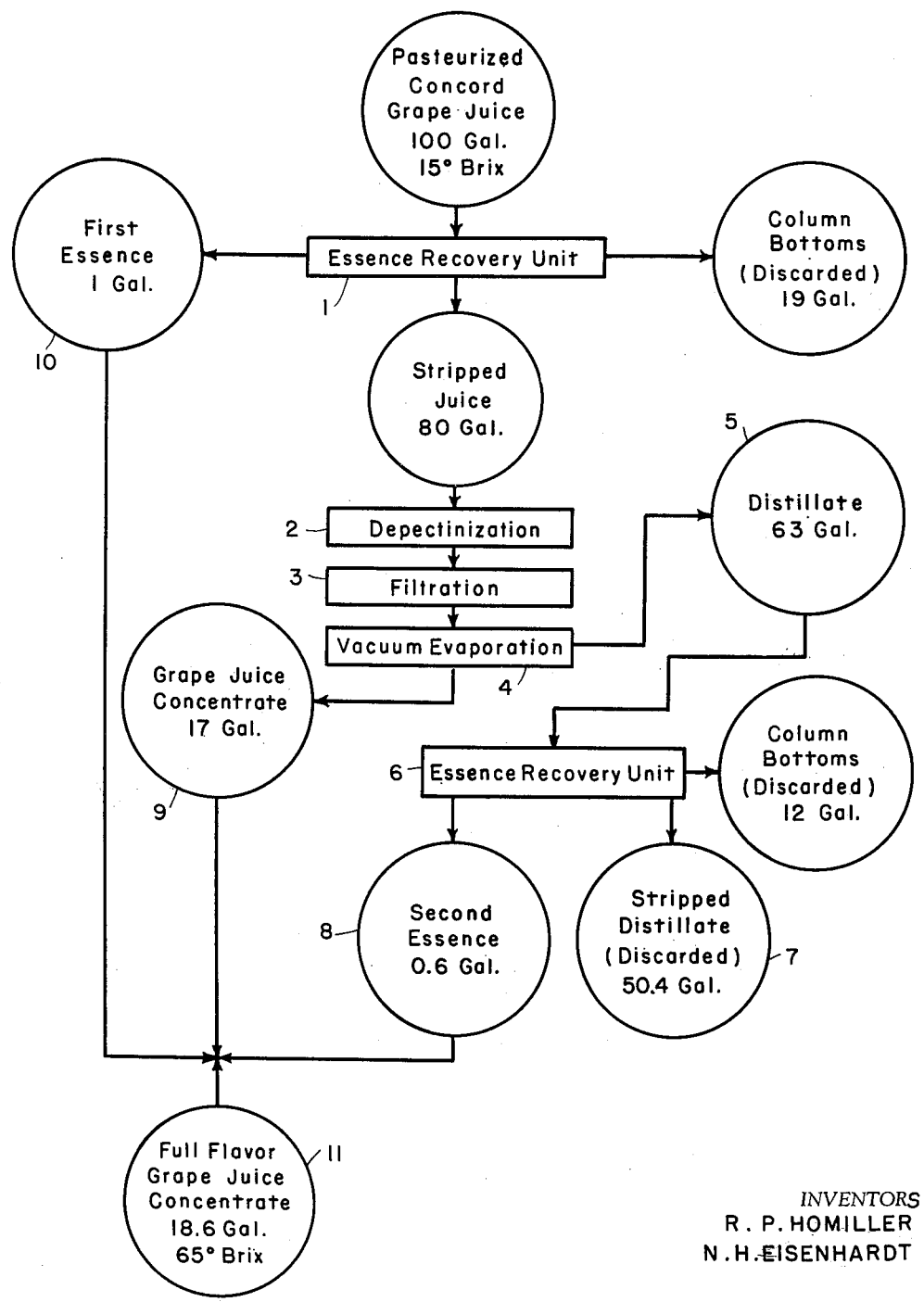
INVENTORS
R. P. HOMILLER
N. H. EISENHARDT
BY
*L. M. Mantell*
ATTORNEY

Patented Oct. 30, 1951

2,572,846

UNITED STATES PATENT OFFICE 2,572,846

PROCESS FOR THE PREPARATION OF FULL FLAVORED FRUIT CONCENTRATES

Richard P. Homiller, Three Tuns, and Nelson H. Eisenhardt, Philadelphia, Pa., assignors to the United States of America as represented by the Secretary of Agriculture Application June 20, 1950, Serial No. 169,279

5 Claims. (Cl. 99—205)

(Granted under the act of March 3, 1883, as amended April 30, 1928; 370 O. G. 757)

The invention herein described may be manufactured and used by or for the Government of the United States of America for governmental purposes throughout the world, without the payment to us of any royalty thereon.

This invention relates to a method of obtaining volatile flavors derived from fruit juices and of recovering these flavors in concentrated form.

It is known that an essence containing substantially all the volatile flavor constituents of certain fruit juices can be produced by vaporizing a portion of the juice and separating the noncondensible gases and the bulk of water vapors from the other components of the vaporized portion of the juice by procedures described in U. S. Patent No. 2,457,315, as well as in Circular AIC-63 and Supplement to Circular AIC-63, published in September 1944 and April 1945, respectively, by the Agricultural Research Administration, Bureau of Agricultural and Industrial Chemistry, United States Department of Agriculture.

The stripped juice, that is the unvaporized portion of the fruit juice obtained in accordance with the processes of the above cited references, is in the case of apples substantially devoid of any volatile flavor constituents of the initial fruit juice. However, we have found that in the case of fruit juices derived from grapes, strawberries, and other nonpomaceous fruits, the stripped juice so obtained, whose flavors may or may not be organoleptically altered by heat in the course of the partial vaporization step, can be utilized for the production of further amounts of valuable volatile flavors.

One form of the process is indicated in the accompanying drawing.

According to the method of our invention, after leaving essence receiving unit 1, the stripped juice is concentrated by evaporation in 4, preferably under reduced pressure at about 60°–105° F., and following enzymatic depectinization in 2, in the case of stripped fruit juices which undergo gelation on such concentration, to produce a concentrate 11, of sufficient solids content (usually about 650°–70° Brix) to render it essentially self-preserving against fermentation on subsequent storage at room temperature.

The vapors emanating from the stripped juice during the concentration in 4 are condensed to a liquid distillate collected in 5, which contains an appreciable amount of flavor constituents similar in nature, or altered, when compared with those of the initial fruit juice. We have further found that the flavor constituents present in the distillate so obtained can be substantially completely recovered therefrom in the form of an essence, that is, an aqueous solution of the concentrated flavors by subjecting the distillate to fractional disillation, preferably in a manner similar to that described in the aforementioned publications. Instead of the normal 8–10% vaporization, we vaporize from about 15 to 25% bp volume of the distillate in unit 6. We remove the bulk of the water vapors from the resulting vaporized products by fractional distillation, condense the remaining vapors to form a liquid distillate which is removed at 7, and recover the flavor constituents present in the residual gaseous portion of the vaporized products by dissolution on contact with the liquid distillate, thereby forming an essence of 100- to 150-fold volumetric concentration recovered at 8.

As an illustrative embodiment of a manner in which our invention may be carried out in practice the following example is given, wherein Step 1 shows the production of the stripped juice and of a volatile flavor essence from grape juice while Steps 2 and 3 exhibit the process of our invention as applied to the recovery of additional flavor constituents from the stripped grape juice.

Step 1

Pasteurized Concord grape juice stored under commercial storage conditions for a minimum period of about three months was screened through a 35-mesh screen to remove the argol and fed at a rate of 5 gallons per hour to a rapid atmospheric evaporator consisting of a U-shaped 3.75-foot length of ¼ inch, 20 gauge, stainless steel tubing, preheating section and a 1.25-foot length of ⅜ inch, 20 gauge, stainless steel tubing vaporizing section enclosed in a 2-inch, I. P. S. pipe, steam chest. Steam pressure on the chest was maintained at approximately 18 p. s. i. gauge. Under these conditions 20 percent, by volume, of the juice was vaporized and the retention time of the juice in the evaporator is approximately 5 seconds or less. The effluent juice-vapor mixture was passed to a centrifugal vapor-liquid separator and the stripped juice collected from the bottom of the separator was cooled in a water jacketed tube cooler to about 80° F. preparatory to further processing. The 20 percent vapor fraction containing the volatile flavor constituents of the original juice at five fold volumetric concentration was taken from the top of the separator through an orifice meter and passed to the bottom of a fractionating column 2 inches in diameter, packed to a depth of 41.2 inches with ⅜-inch Raschig rings. A 250-watt reboiler located at the base of the column served the dual purpose of stripping any volatile constituents from the bottom discharge of the column and supplying a sufficient amount of heat to compensate for heat losses from the unlagged column. The vapors were passed through the column to a water cooled surface condenser, condensed and then cooled to about 100° F. in the condenser. The condensate was withdrawn at one 100th of the original juice volume feed rate, the remainder being returned to the column as reflux. The bottoms products obtained from the column and consisting essentially of water were discarded. That part of the condensate withdrawn as 100-fold essence was transferred by means of a bellows type metering pump to the top of a small scrubbing or absorption tower, 1 inch in diameter, packed to a depth of 7 inches with ¼-inch Berl saddles, and immersed in an ice bath. The non-condensible gases vented from the bottom of the condenser were stripped of the volatile flavor constituents contained therein by passing them countercurrent to the metered condensate flowing through the scrubbing tower while maintaining the temperature of the ice bath at such a level that both condensate and gaseous products were cooled to approximately 40° F. within the tower. The top of the tower was vented to the atmosphere to discharge the vent gases, while the essence was withdrawn from the bottom of the tower.

Step 1 is similar to the process carried out in Homiller et al., Patent 2,479,745. The apparatus is similar; a centrifugal separator being substituted for the expansion chamber.

Step 2

Approximately 38 pounds (4.27 gallons) of the stripped juice were collected from the bottom of the centrifugal vapor-liquid separator, as described in the foregoing example, into a steam jacketed stainless steel tank 2. 0.08 pound of a commercial pectinase preparation containing $1.5 \times 10^{-5}$ P. G. units active enzyme was added to the stripped juice with agitation, and the mixture allowed to stand overnight at room temperature (70° F.). The excess enzyme was then deactivated by slowly heating the batch to 140° F. and holding it at this temperature for 15 minutes, while stirring. Diatomaceous earth filter aid was then added and the batch filtered on a stainless steel plate and frame filter press 3, through cloths precoated with diatomaceous earth filter aid. The filtered juice was then fed to a glass bodied, stainless steel external calandria 4, natural circulation vacuum evaporator operating at 28.0 inches of mercury vacuum with a batch temperature of 101° F., and evaporated in one hour and 43 minutes to a concentration of 70° Brix. The distillate from the evaporation was condensed in a water cooled surface condenser, and the distillate was collected in a suitable receiver 5 under vacuum. Approximately 9 pounds (1 gallon) of concentrate and 28 pounds (3.4 gallons) of distillate were thus obtained.

Step 3

The volatile flavor constituents of the distillate produced as described in the foregoing example were recovered as a second essence by the distillation procedure of Step 1 in essence recovery unit 6. The feed rate to the rapid evaporator of this unit was 5 gallons per hour of which 20 percent by volume were vaporized by maintaining the steam pressure on the chest at 16 p. s. i. g. An essence of 100-fold volumetric concentration was withdrawn from the bottom of the scrubbing tower into 8.

The relative potency or strength of the "first essence" of Step 1 and of the "second essence" obtained as described in Step 3 were determined by a series of organoleptic tests conducted under standardized conditions and consisting in determining the highest dilution at which the odor of essence is first detectable; small differences in essence potency being more readily detectable at low concentrations. The results thus obtained, expressed in fold of perception range at threshold dilution, showed the following average volumetric fold dilutions at which the panel was able to detect the first odor.

First grape juice essence 1/219 fold
Second grape juice essence 1/32 fold

These data indicate that the first essence is six to seven times stronger than second essence.

Reconstituted juices obtained on blending, in proper proportions, grape juice concentrate 9, first essence 10, second essence 8, and odorless distilled water match more closely the original juice, in taste and aroma, than the corresponding products formed by combining the concentrate only with the first essence and water. This is shown by the following data in which the samples were rated on a scale of 0-10 by a taste panel of six highly trained persons.

| Sample | Description of Sample | Brix | Volumetric Fold | Average Score | |
| --- | --- | --- | --- | --- | --- |
| | | | | Taste | Odor |
| Standard | Feed or stored pasteurized Concord grape juice. | 8.5 | ½ | 7 | 7 |
| A | Concentrate+water+first essence. | 8.5 | ½ | 6.2 | 6.2 |
| B | Concentrate+water+first essence+second essence. | 8.5 | ½ | 7.2 | 6.7 |
| Standard | Concentrate+water. | 8.5 | ½ | 2 | 2 |

Having thus described our invention, we claim:

1. The process comprising stripping a non-pomaceous fruit juice of volatile flavor constituents by subjecting the juice to partial vaporization by heating at atmospheric pressure; separating the vaporized portion containing a major proportion of the volatile flavors from the unvaporized portion of the juice; passing the vapors through a fractionating column; condensing the volatile flavor vapors by cooling; recycling part of this cooled condensate to the fractionating column to condense the water vapors therein; removing another part of said condensed volatile flavors, which part forms a first essence; depectinizing the unvaporized portion of the juice, which is stripped juice; concentrating the depectinized juice by evaporation under reduced pressure to form a juice concentrate; condensing the resultant vapors to form a liquid distillate; heating the distillate to vaporize part of it; separating the vaporized portion and forming a second liquid essence therefrom by fractionation, condensation, and recycling of condensate to the fractionation as aforesaid; and combining the first essence, second essence, and the said juice concentrate to form a juice concentrate of fuller flavor.

2. The process of claim 1 in which the juice is grape juice.

3. The process of obtaining from grape juice a concentrated aqueous solution of volatile flavorous and odorous components which comprises subjecting the juice to partial vaporization at atmospheric pressure by the application of heat; separating, from the unvaporized portion of the juice, the vaporized portion containing a major portion of the volatile flavorous and odorous components and forming from them, by fractional distillation and condensation, a concentrated aqueous solution hereby denominated "first essence"; depectinizing by enzymatic action the said unvaporized portion of the juice and concentrating the depectinized juice by evaporation, at reduced pressure and at a temperature not greater than 105° F., to a density of between 65° and 70° Brix; condensing the resultant vapors to form a liquid distillate; vaporizing at atmospheric pressure, by the application of heat, 15 to 25% of said distillate; segregating the vaporized products thus obtained and containing water vapor and volatile flavorous or odorous components; separating the greater portion of the water vapors by fractional distillation and condensing the greater portion of the remaining vapors to form an aqueous solution of flavorous or odorous components; and recovering the flavorous or odorous components present in the uncondensed portion of said remaining vapors by absorption in said aqueous solution to form a "second essence."

4. The process of claim 3 and combining the first essence, the second essence and the concentrated depectinized juice to form a full flavor grape juice concentrate.

5. The process comprising stripping a non-pomaceous fruit juice of volatile flavor constituents by subjecting the juice to partial vaporization at atmospheric pressure, the retention time in the evaporator being not more than about five seconds, separating the vaporized portion of the volatile flavors from the unvaporized portion of the juice, which is stripped juice; forming a first concentrated aqueous fruit essence from the vapors by condensing and removing water vapor therefrom and condensing the remaining volatile fruit flavors; concentrating the stripped juice by heating under vacuum for at least about an hour to form a juice concentrate to remove further volatile flavors therefrom; condensing the resultant vapors to form a liquid distillate; heating the distillate to vaporize part of it; and forming a second essence from the latter vapors by condensing water vapor therefrom and condensing the remaining volatile fruit flavors; and combining the first essence, the second essence, and the said juice concentrate to form a full flavored fruit essence.

RICHARD P. HOMILLER.
NELSON H. EISENHARDT.

REFERENCES CITED

The following references are of record in the file of this patent:

UNITED STATES PATENTS

| Number | Name | Date |
|---|---|---|
| 2,423,747 | Zahm | July 8, 1947 |
| 2,457,315 | Milleville | Dec. 28, 1948 |
| 2,479,745 | Homiller et al. | Aug. 23, 1949 |
| 2,513,813 | Milleville | July 4, 1950 |